United States Patent
Garcia et al.

(10) Patent No.: US 11,082,119 B2
(45) Date of Patent: Aug. 3, 2021

(54) DETECTION OF WEAK USERS IN BEAM SELECTION FOR MASSIVE MIMO RECEIVER

(71) Applicant: Telefonaktiebolaget LM Ericsson (publ), Stockholm (SE)

(72) Inventors: Virgile Garcia, Antibes (FR); Ning He, Sollentuna (SE)

(73) Assignee: Telefonaktiebolaget LM Ericsson (Publ)

( * ) Notice: Subject to any disclaimer, the term of this patent is extended or adjusted under 35 U.S.C. 154(b) by 0 days.

(21) Appl. No.: 17/053,036

(22) PCT Filed: May 10, 2018

(86) PCT No.: PCT/CN2018/086250
§ 371 (c)(1),
(2) Date: Nov. 4, 2020

(87) PCT Pub. No.: WO2019/213884
PCT Pub. Date: Nov. 14, 2019

(65) Prior Publication Data
US 2021/0135742 A1 May 6, 2021

(51) Int. Cl.
*H04B 7/0413* (2017.01)
*H04B 7/08* (2006.01)
*H04B 7/06* (2006.01)

(52) U.S. Cl.
CPC .......... *H04B 7/088* (2013.01); *H04B 7/0413* (2013.01); *H04B 7/0695* (2013.01)

(58) Field of Classification Search
CPC .. H04B 7/0617; H04B 7/0478; H04B 7/0456; H04B 7/0469; H04B 7/04; H04B 7/0695;
(Continued)

(56) References Cited

U.S. PATENT DOCUMENTS

2017/0366242 A1* 12/2017 Lee ................ H04B 7/0408

FOREIGN PATENT DOCUMENTS

| CN | 105210306 A | 12/2015 |
|---|---|---|
| CN | 107980209 A | 5/2018 |
| WO | 2016070706 A1 | 5/2016 |

OTHER PUBLICATIONS

International Search Report and Written Opinion dated Jan. 30, 2019 for International Application No. PCT/CN2018/086250 filed on May 10, 2018, consisting of 6-pages.
(Continued)

*Primary Examiner* — Rahel Guarino
(74) *Attorney, Agent, or Firm* — Christopher & Weisberg, P.A.

(57) ABSTRACT

There is disclosed a method of operating a receiver arrangement in a radio access network. The receiver arrangement is adapted for receiving a plurality of antenna signals from a plurality of antennas, wherein the plurality of signals is collected to form a collected signal. The method includes transforming the collected signal into beam space based on a transform base, to provide a set of beams, selecting a subset of beams from the set of beams and evaluating the subset of beams for a quality requirement. If evaluating results in the quality requirement not being fulfilled, either the subset of selected beams is changed and it is returned to evaluating or the transform base is changed and it is returned to transforming. The disclosure also pertains to related methods and devices.

20 Claims, 2 Drawing Sheets

(58) Field of Classification Search
CPC ...... H04B 7/0452; H04B 7/068; H04B 7/088; H04B 17/336; H04B 7/0408; H04B 7/0413; H04L 27/2636
See application file for complete search history.

(56) References Cited

OTHER PUBLICATIONS

3GPP TSG RAN WG1 Meeting #88 R1-1703388; Title: Beam management procedure and beam reporting for NR; Source: Vivo; Agenda Item: 8.1.2.2.1; Document for: Discussion and Decision; Date and Location: Feb. 13-17, 2017, Athens, Greece, consisting of 5-pages.

* cited by examiner

DETECTION OF WEAK USERS IN BEAM SELECTION FOR MASSIVE MIMO RECEIVER

CROSS-REFERENCE TO RELATED APPLICATIONS

This application is a Submission Under 35 U.S.C. § 371 for U.S. National Stage Patent Application of International Application Number: PCT/CN2018/086250, filed May 10, 2018 entitled "DETECTION OF WEAK USERS IN BEAM SELECTION FOR MASSIVE MIMO RECEIVER," the entirety of which is incorporated herein by reference.

TECHNICAL FIELD

This disclosure pertains to wireless communication technology, in particular in the context of massive MIMO (Multiple Input, Multiple Output).

BACKGROUND

Multi-antenna systems allow transmitting signals focused towards certain spatial regions. Beams can be created ("beam forming") whose coverage (range) can go beyond transmissions using non-beamformed signals, but at the cost of narrower coverage in angular coverage. This is a classic trade-off between distance and angular coverage. Similar considerations are relevant for reception beams In 5G/NR, radio devices are expected to operate with large number of antennas ("Massive MIMO"), offering flexibility and potentially very narrow beams (very large focusing gain). Massive MIMO makes a clean break with current practice through the use of a very large number of service antennas that are operated fully coherently and adaptively.

While massive MIMO renders some traditional research problems irrelevant, it uncovers entirely new problems that urgently need attention, especially related to practical considerations. In particular, the processing and hardware requirements needed to treat the large increase with multiple parallel data streams from all the antennas. Considering massive MIMO with dozens or hundreds of signals, the real-time processing is a major challenge. Combining is particularly affected by the scaling of the numbers.

Utilizing multiple antennas at the receiver allows for sampling of the signal over a larger antenna aperture, which increases the overall received power. Further, it allows for coherent combination of multiple copies of the received signal, and hence provides an additional receive beamforming gain in the direction of interest. Since the users, and signals are in general not distributed evenly in space, this may provide a possibility of only processing the signals (beams) which contain valuable information. Hence, the beam space processing with beam selection may provide a complexity reduction.

Combining complexity is a practical challenge. The hardware and processing capabilities are a tradeoff between cost and performance. While MMSE is an optimal combining operation, the real-time and speed requirements only allow matrices of small dimensions to be processed, as the complexity of matrix inversion is growing exponentially with the matrix size.

Thus, new approaches for handling massive beam forming systems are required.

SUMMARY

50 It is an object of this disclosure to provide approaches allowing improved handling of sets of reception beams, in particular efficient detection of weak beams and/or efficient selection of beams. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR (New Radio), for example release 15 or later, or LTE Evolution. The approaches may in particular be implemented for VL-MIMO (also referred to as Massive MIMO), in particular MIMO reception.

Accordingly, there is disclosed a method of operating a receiver arrangement in a radio access network. The receiver arrangement is adapted for receiving a plurality of antenna signals from a plurality of antennas, wherein the plurality of signals is collected to form a collected signal. The method comprises transforming the collected signal into beam space based on a transform base, to provide a set of beams and selecting a subset of beams from the set of beams. The method also comprises evaluating the subset of beams for a quality requirement. If evaluating results in the quality requirement not being fulfilled, either the subset of selected beams is changed and it is returned to evaluating, or the transform base is changed and it is returned to transforming.

There is also disclosed a receiver arrangement for a radio access network. The receiver arrangement is adapted for receiving a plurality of antenna signals from a plurality of antennas, wherein the plurality of signals is collected to form a collected signal. The receiver arrangement is adapted for transforming the collected signal into beam space based on a transform base, to provide a set of beams. The receiver arrangement is also adapted for selecting a subset of beams from the set of beams, and for evaluating the subset of beams for a quality requirement. The receiver arrangement is adapted for, if evaluating results in the quality requirement not being fulfilled, either changing the subset of selected beams and returning to evaluating, or for changing the transform base and returning to transforming.

A receiver arrangement may be any device or collection of devices adapted for providing the functionality associated to a receiver arrangement herein. The functionality may be implemented in one device, or distributed over several devices and/or circuitries and/or modules. Such device or devices may comprise a radio node, in particular a network node like a gNB or eNB or base station or transmission point or access point or radio dot. However, in some cases, in particular for carrier frequencies above 1 GHz or 2 GHz, the receiver arrangement may be implemented in a terminal or user equipment.

The receiver arrangement may be connected or connectable to, and/or comprise, the plurality of antennas, e.g. to receive the signals and/or to receive the collected signal. The collected signal may be provided by an antenna arrangement, or may be collected from the plurality of signals by the receiver arrangement. Collecting may comprise, and/or be based on, performing one or more processing actions, e.g. calculations and/or estimations, etc.

It may be considered that the plurality of antennas is associated to, and/or implemented in an antenna arrangement or antenna array. The arrangement or array may be a phase array.

It may be considered that the transform base or the changed transform base is based on an approach like a Discrete Fourier Transform or a codebook or a Singular Value Decomposition. When changing the transform base, a parametrisation of the transform base may be changed, and/or the approach may be changed. A parametrisation may pertain to spatial and/or angular extension of one or more beams, and/or resolution of the approach, e.g., matrix size and/or codebook size and/or sampling points.

Transforming into beam space based on a transform base may be considered beamforming, and/or a form of combining.

The collected signal may comprise received signaling from one or more transmitters. A transmitter may generally be a radio node, in particular a terminal or user equipment. However, in some cases, a transmitter may be a network node. A transmitter may be known to the receiver arrangement, or perform random access to become known, or be discovered and/or detected by the receiver arrangement. It may be considered that signaling from a transmitter is expected, e.g. due to scheduling, which may be performed by the receiver arrangement. Generally, the receiver arrangement may be adapted for signal transmission.

A quality requirement may represent a set of one or more conditions and/or parameters and/or threshold and/or values to be fulfilled or taken such that the requirement is fulfilled, e.g. associated to corresponding measures or metrics. The requirement generally may pertain individually to transmitter, and/or to beams. Evaluating may generally comprise performing measurements on signaling and/or extracting information from the collected signal and/or subset of beams or one or more beams. It may be considered that evaluating comprises associating a quality requirement to a transmitter. A quality requirement may generally pertain to a channel estimate and/or reception strength and/or signal quality (e.g., SINR and/or SIR and/or SNR). It may be considered that it comprises a signal quality threshold, e.g. a SINR or SIR threshold. The threshold may be the same for different transmitters, or different for different transmitters.

Evaluating may comprise evaluating whether received signaling associated to one or more transmitters fulfils the quality requirement, e.g., for one or more, or for each, of the transmitters individually.

The receiver arrangement may be adapted for, and/or the method may comprise, subtracting one or more received signaling fulfilling the quality requirement, and/or a removal requirement, from the collected signal before changing the subset and/or the transform base. Alternatively, or additionally, the signaling/s may be subtracted from the representation of the collected signal in beam space. Thus, a known quantity may be removed from the collected signal, allowing weaker signalings to become relatively stronger. The removal requirement for determining whether to subtract or not may correspond to a stronger signal or higher signal quality than the quality requirement. Subtracting signaling may comprise decoding and/or demodulating the signaling, and/or may comprise error decoding. It may be considered that subtracting comprises, and/or represents interference cancellation.

There is also considered a program product comprising instructions causing processing circuitry to control and/or perform any one of the methods described herein.

Moreover, a carrier medium arrangement is described, the carrier medium arrangement carrying and/or storing a program product as described herein.

The approaches described herein allow efficient handling beams in particular in a massive MIMO scenario. In particular, weaker signaling may be detected without requiring maximum use of beams in an iterative approach. Generally, signaling from a transmitter may be considered strong if it fulfils the quality requirement, whereas signaling no fulfilling the quality requirement may be considered weak. Iterations may be performed until all weak signals are detected to become strong, or until a given processing threshold has been reached, e.g. total number of beams, resolution of transform base, and/or number of changes of base, and/or processing time (e.g., actual or predicted).

Different beams may differ in topology and/or shape and/or angular and/or spatial extension and/or direction and/or size and/or regarding to resources, in particular time and/or frequency resources. Different beams in some cases may overlap, e.g. in angular/spatial extension, and/or time/frequency, or be completely distinct. It may generally be considered that beams of the set are time-shifted, e.g. within the same transmission timing structure, like a transmission time interval or and/or slot or subframe. It should be noted that due to multi-path propagation, signaling from a transmitter may be received in different beams, even if they do not overlap.

The set of beams may comprise a plurality of beams, in particular 2 or more, 4 or more, 8 or more, 10 or more, 12 or more, 16 or more, or 20 or more, or 50 or more beams. The set may pertain to a specific time interval, and/or comprise beams used in and/or defined and/or configured for that interval. A beam, or the set of beams, may change over time, e.g. in the time interval, e.g. due to beam switching and/or beam sweeping. The time interval may, for example, be a transmission timing structure. The set of beams may comprise reception beams defined or formed by (reception) beamforming. The set of reception beams may be defined, e.g. based on location of the receiving radio node or receiver arrangement or antenna arrays, and/or may be configured or configurable, e.g. during operation. During operation, it may not be necessary or efficient to use all beams for further processing, such that a selection out of the set may be useful.

Selecting one or more beams may comprise selecting a subset of beams, the subset being smaller than the set, and/or containing and/or consisting of not all beams of the set. The subset thus may be considered a true or limited subset of the set. Selecting the subset may be based on a beam metric, e.g. signal strength, e.g. such that a number N of beams with highest signal strength are selected. Selecting may comprise determining, e.g. estimating and/or calculating and/or measuring, the metric.

Changing the subset of beams may comprise adding one or more beams from the set to the subset, and/or replacing one or more beams of the subset with beam/s of the set. The set of beams may comprise a number of distinct beams.

Beamforming may generally comprise utilising independently controllable antenna elements and/or arrays (or subarrays/panels), which may be associated to an antenna arrangement, to produce a directed beam of radiation (for transmission), or to provide a (directional and/or angular, in particular regarding spatial angle) cut-out of an incoming radiation field according to a reception beam, e.g. based on timing and/or phase. A beam may have complicated shape, e.g. it may be multi-lobed, and/or irregular, depending on the number of antenna elements/arrays used for defining it. Reception beamforming may be performed by beamforming or combining circuitry, which may be adapted therefor, and/or may be performed on based on a total receives signal or received radiation field. Depending on implementation, beamforming circuitry may be processing circuitry, and/or antenna circuitry and/or radio circuitry, or implemented separately. An antenna arrangement may comprise a plurality of different antenna elements and/or arrays (or subarrays, e.g. panel/s), which may be independently controllable. Being independently controllable for reception beamforming may be considered to comprise and/or represent that signals representing a received radiation field (e.g., output by an ADC and/or amplifier of associated to the antenna element or array) may be handled (evaluated) independent from signals from other such devices, which may be associated to different array/s and/or antenna element/s. Reception beamforming may comprise a beam space transformation, in which signals from an antenna arrangement, in particular from different independently controllable antenna elements or subarrays or arrays, are mapped to define a set of beams in a beam space representation. An antenna arrangement may comprise at least 10, at least 20, at least 50 or at least 70 independently controllable antenna elements or arrays or subarrays, e.g. panels. In some variants, antenna elements may be configurably associated to (different) subarrays.

Selecting may in general be based on a beam quality representation (e.g., based on the quality requirement) determined for one or more beams and/or for one or more of multiple layers of transmission from the one or more transmitters. A (beam) quality representation or quality representation may represent a (beam) quality measure or metric, e.g. for transmitter or beam. It may pertain to a specific transmitter or a group of transmitters, e.g. based on location. It may be considered that the (beam) quality representation generally represents and/or pertains to one or more (beam) quality metrics. Selecting may be performed in regular or irregular time intervals, e.g. based on operation conditions, e.g. number of transmitters from which transmission is to be expected and/or served by the receiving radio node or receiver arrangement. In particular, selecting (e.g., of different beams or subsets) may be performed for each transmission time interval or slot or subframe, or slot aggregation, or for a specific time interval like 1 ms or 2 ms, or a frame (a frame may comprise a predefined number of slots or subframes, or be fixed to e.g. 10 ms). A layer of transmission may correspond to a transmitted signaling using a specific transmitting antenna configuration (e.g., element or subarray or array). Different layers may correspond to different signaling/data streams, which may be transmitted by different antenna elements or arrays or subarrays (the antenna elements being associated to the transmitter transmitters may have different antenna arrangements from the receiver arrangement, or the same).

Quality metrics may pertain to received signal strength, and/or received signal quality, and/or covariance of received signaling, and/or direction of received signaling. Received signal strength may be represented by a suitable parameter, e.g. by received power and/or energy and/or amplitude, and/or a distribution thereof. Signal quality may be represented by a suitable parameter like SNR, SINR, SIR, etc. Covariance may be represented by a covariance parameter. The quality requirement or representation, metric or measure may be determined based on received signaling, in particular reference signaling, which may be measured to determine the representation, metric or measure. The reference signaling may be associated to and/or transmitted by a transmitter and/or user.

A quality representation may in general be associated to a user and/or transmitter (a user may represent a transmitter). One or more beams may be associated to a transmitter or user, e.g. due to multi-path effects. For different users and/or transmitters, different quality representations may be determined, in particular for different and/or each beam. It may be considered that for each user/transmitter, and/or for each beam, a quality representation is determined, e.g. as part of selecting the one or more beams. A quality representation may comprise and/or pertain to one or more measures, metrics or parameters, and may be considered a parametrisation or a set of one or more parameters.

In particular, a quality representation, which may be associated to and/or represent a quality requirement, may be associated to a transmitter and/or user, and may represent a combination of a plurality of quality metrics for one or more beams.

BRIEF DESCRIPTION OF THE DRAWINGS

The drawings are provided to illustrate concepts and approaches described herein, and are not intended to limit their scope. The drawings comprise.

Transforming the collected signal into beam space results in focusing the received energy into fewer beams than the original signal. Selection of a subspace of the full beam space (a subset of beams) is helpful to reduce further processing, but it is hard to know beforehand the signal quality after of the combining, particularly in case of multi-user MIMO. For example, weak users might be "invisible" relative to strong users, and thus may be "deleted" during the beam reduction process.

There is generally proposed a multi-stage spatial transformation (transforming into beam space) and beam selection algorithm. Firstly, spatial transformation and beam selection down to a desired number of beams of different reasons e.g. for which the HW is capable to handle. Evaluation may be performed, e.g. comprising channel estimations, for example to determine if all users/transmitter or associated signalings are of good enough signal quality. If not, channel estimations may be performed using beam/s from the rest of beams of the original set for the users with bad signal quality. In case the weak user(s) are not detected or of poor quality, the basis of the spatial transform may be changed, to redo the channel estimation and selection process for the weak users. Alternatively, or additionally, the strong signals or associated transmitters may be subtracted, e.g. in element space (collected signal) or beam space, for example to redo the procedure for the weak user(s). Moreover, the whole procedure can be stored and trained in a learning process which will measure and adjust the multi-stages, thus can reduce processing latency of the weak users.

This solution aims at reducing misdetection of weak users in multi-user massive MIMO reception and enhance reception performance of weak users.

Figure 1:
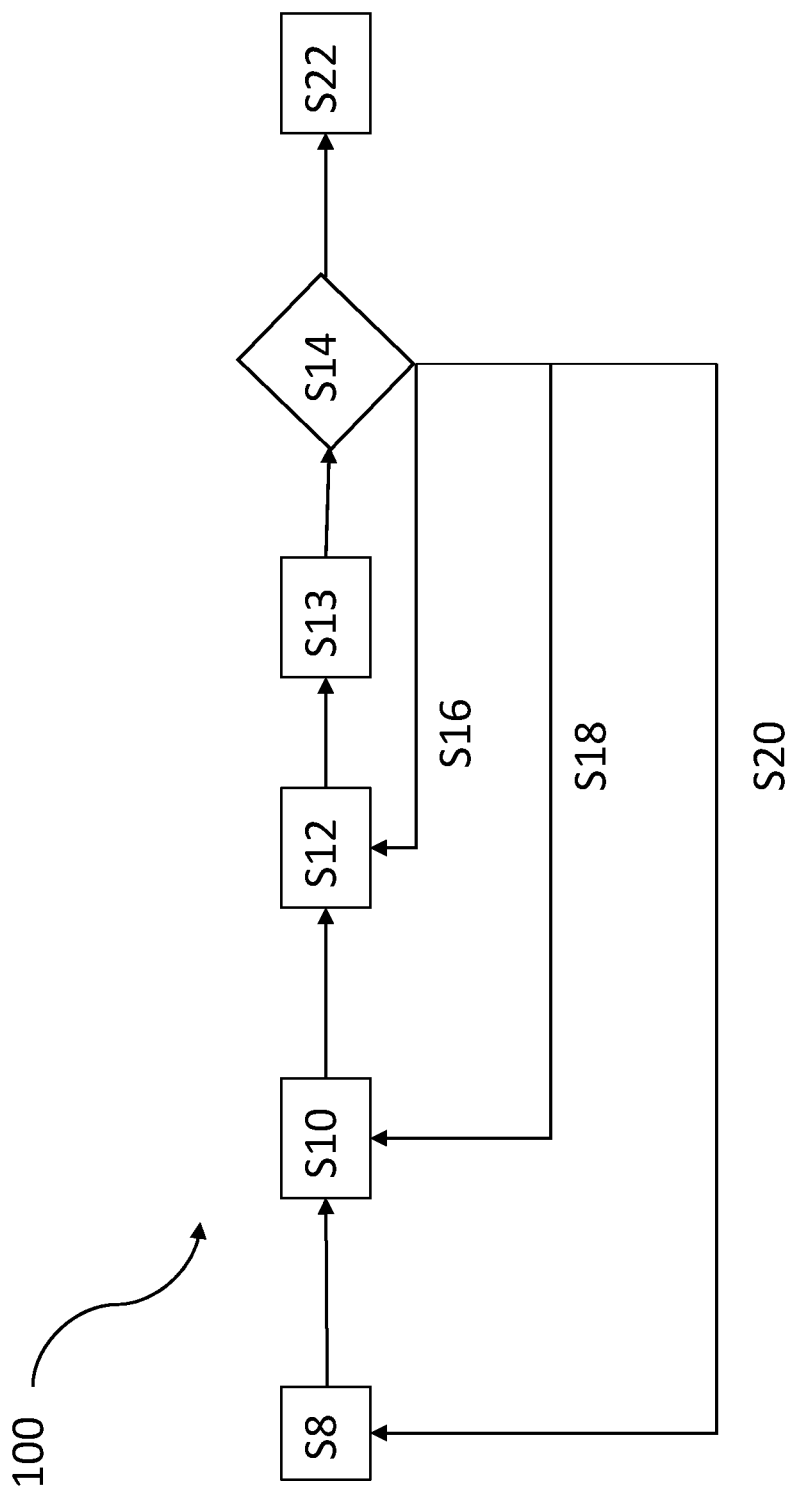
FIG. 1, showing an exemplary receiver arrangement.

An approach comprising, e.g. iterative, beam transformation, beam selection and detection (evaluation) is described and illustrated in FIG. 1. A receiver arrangement 100 takes input signals from all N_rx antenna elements, which may be collected in action S8 into a collected signal, e.g. by the antenna arrangement, or a device or module of the receiver arrangement. In an action S10, which may be performed by beamforming circuitry and/or spatial transformation circuitry and/or an associated module of the arrangement 100, spatial transforming with one of a set of transform bases is performed, e.g. DFT bases, Codebooks or SVD bases, to provide a set of beams, which represent the collected signal in beam space. In action S12, a subset of beams, e.g. N≤N_rx beams, of the set of beams is selected, e.g. according to highest power or beam quality. S12 may be performed by a selecting device, e.g. selecting circuitry and/or selecting module. An action S13 may be considered, a quality representation or requirement for the beams of the subset and/or signalings and/or transmitters may be performed, e.g. utilizing channel estimation, and/or combining weights for all intended users (a user may be considered an exemplary transmitter). In action S14, it may be evaluated whether a beam or signaling from a transmitter fulfils a quality requirement. Action S13 and S14 may be combined in one action. The receiver arrangement may comprise an evaluation device and/or circuitry and/or module for such action. The evaluation may be performed for each transmitter and/or beam and/or signaling, in particular expected signalings and/or transmitters (which may be scheduled for transmission). If all quality requirements are fulfilled, further processing may be performed in action S22, e.g. demodulating and/or measuring and/or HARQ processes, and/or responding to the transmissions. New signals may be input. If not all quality requirements are fulfilled, e.g. there are one or more weak beams, in an action S16 the subset of beams may be changed, and it may be returned to action S12. Alternatively, the transform base may be changed in action S18, and it may be returned to action S10. In either case, the detected strong signaling may be subtracted for interference cancellation. Whether it is returned to S10 or S12 may depend on a subset criterium, e.g. a maximum number of beams in the subset (e.g., the total number of beams in the set), and/or number of tries with different subsets. It may be considered that it is returned to S8 with new signals in action S20 being input depending on a stop criterium, e.g. in terms of processing time and/or number of tries.

The described approach may for example be performed on a time basis, e.g. slot basis, whose length in time may be configured or configurable, and/or for a specific time interval, e.g. 1 ms between new signals being collected into a collected signal. It may be considered that the signals from the antennas and/or the collected signal represent signaling received in a time interval corresponding to the time basis.

It should generally be noted that the circuitries of the receiver arrangement may be separate, or the same circuitry used for different functionality.

In S10, it may be considered that with use of DFT transform base or a codebook base, pre-calculated ones can be reused, in particular if returning. With use of SVD bases, re-calculation may be needed, but the processing effort may be controlled by parameters how often it is re-calculated.

Additional and/or alternatively, it may be considered to do hard- or soft-decision on the strong users and subtract them from the antenna signals received and/or from the collected signal. A decision may be based on a removal requirement, which may for example require one value or parameter to achieve a threshold for a hard decision, or a combination of weighted parameters for a soft decision.

Figure 2:
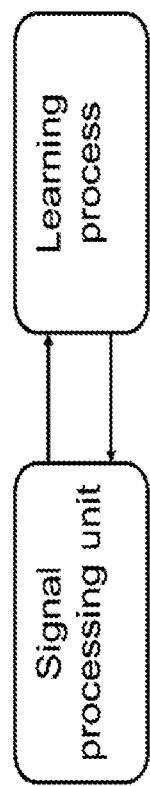
FIG. 2, showing an exemplary schematic.

Optionally, as indicated in FIG. 2, processing actions and/or parameters used for each transmitter (e.g., subset and/or transform base and/or subtracted signaling), or only for one or more weak and undetected user/s can be stored and added to a learning process to provide instruction for the next set of input signals in action S8, e.g. to use the same steps as the previous one until the condition of those weak users are changed, e.g. some of them become stronger or weaker. A signal processing unit as shown may represent, or be associated to, a receiver arrangement or a component thereof in communication with, and/or implementing, the learning process.

Various methods can apply on how to sort and prioritize beams for selection, but this is outside the scope of this disclosure. Some examples relate to total/maximum beam number limitations.

One example of beam selection and ordering is to sort all the beams by the joint received strength of users' channel estimates on these beams (Sort($\Sigma_i \|h_{i,j}\|^2$) assuming $h_{i,j}$ is the channel estimate of user i on beam j) in descending order (strongest to weakest beams). Then the selection of N beams is done taking the N strongest beams.

The beam selection may prepare an ordered list of beams, e.g. according to strength or another criterium, and can provide a subset containing a specific given number of beams. The ordered list may be maintained as long as the joint selection-combining is not completed, to avoid recalculation. The initial number of beams to be selected may be set by default or changed using history or importance of the service in latency.

In some variants, every time the loop requests additional beams for changing the subset, the subspace selection adds a number of beams to the previous subset. The number of beams to be added can be: Fixed, and set by configuration (e.g. related to hardware implementation and computing capabilities); or Dynamically defined, based on the difference between the SINR estimation and the SINR required. Dynamic numbers are however bounded by hardware and processing configurations.

The sub-selection may be constrained by practical limitations, e.g. the maximum allowed number of beams (absolute or fraction of the total), due to processing or HW limitations.

If the weak users get missing from all beams, change of the transform bases by rotation (e.g., using a suitable change of parametrisation), or use of SVD in case the first bases are based on DFT or Codebooks may be considered.

In case the strong users are far too strong compared to the weak users, various methods of successive interference cancellation can be applied to cancel (subtract) the strong users from the original signal that the weaker users can be detected. Cancellation based on decisions after demodulation of the strongest users has the advantage of low latency and less HW demand, while decisions after channel decoding are more accurate but have larger latency and requiring more HW resources.

The processing steps used for each user or only for the weak and undetected users can be stored and added to a learning process to provide instructions to the next input set of signals. The learning process can keep track on the conditions of those weak users, e.g. if their SINR remains the same or have been changed and adapt the steps to be used in the signal processing unit. In this way, latency of processing can be decreased.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/ or optically transmissive material, e.g. glass fiber, and/or cable. A storage medium may comprise at least one of a memory, which may be volatile or non-volatile, a buffer, a cache, an optical disc, magnetic memory, flash memory, etc.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel. Signaling may be associated to a specific transmitter and/or channel and/or type, e.g. reference signaling, e.g. DMRS and/or PTRS and/or TRS and/or SRS and/or CSI-RS, e.g. depending on whether the receiver arrangement is associated to a terminal or network node.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based or Orthogonal Time Frequency Space (OTFS) signaling may be considered alternatives).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar.

It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| BQM | Beam quality metric |
| BLER | Block Error Rate |
| CBQM | Combined beam quality metric |
| MU | Multiple user |
| ARQ | Automatic Repeat reQuest |
| CBG | Code Block Group |
| CDM | Code Division Multiplex |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DMRS | Demodulation reference signal |
| FDM | Frequency Division Multiplex |
| HARQ | Hybrid Automatic Repeat Request |
| MCS | Modulation and Coding Scheme |
| MIMO | Multiple-input-multiple-output |
| MMSE | Minimum Mean Squared Error |
| MRC | Maximum-ratio combining |
| MRT | Maximum-ratio transmission |
| MU-MIMO | Multiuser multiple-input-multiple-output |

-continued

| Abbreviation | Explanation |
| --- | --- |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| PTRS | Phase Tracking Reference Signaling |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| TRS | Tracking Reference Signaling |
| UCI | Uplink Control Information |
| UE | User Equipment |
| URLLC | Ultra Low Latency High Reliability Communication |
| VL-MIMO | Very-large multiple-input-multiple-output |

Abbreviations may be considered to follow 3GPP usage if applicable.

The invention claimed is:

1. A method of operating a receiver arrangement in a radio access network, the receiver arrangement being configured to receive a plurality of antenna signals from a plurality of antennas, the plurality of signals being collected to form a collected signal, the method comprising:
   transforming the collected signal into beam space based on a transform base, to provide a set of beams;
   selecting a subset of beams from the set of beams;
   evaluating the subset of beams for a quality requirement; and
   if evaluating results in the quality requirement not being fulfilled, one of:
      changing the subset of selected beams and returning to evaluating; and
      changing the transform base and return to transforming.

2. The method according to claim 1, wherein one of the transform base and the changed transform base is based on one of a Discrete Fourier Transform, a codebook and a Singular Value Decomposition.

3. The method according to claim 1, wherein the collected signal comprises received signaling from one or more transmitters.

4. The method according to claim 3, wherein evaluating comprises evaluating whether received signaling associated to one or more transmitters fulfils the quality requirement.

5. The method according to claim 1, further comprising subtracting received signaling fulfilling the quality requirement from the collected signal before changing at least one of the subset and the transform base.

6. The method according to claim 2, wherein the collected signal comprises received signaling from one or more transmitters.

7. The method according to claim 6, wherein evaluating comprises evaluating whether received signaling associated to one or more transmitters fulfils the quality requirement.

8. The method according to claim 7, further comprising subtracting received signaling fulfilling the quality requirement from the collected signal before changing at least one of the subset and the transform base.

9. The method according to claim 2, further comprising subtracting received signaling fulfilling the quality requirement from the collected signal before changing at least one of the subset and the transform base.

10. The method according to claim 6, further comprising subtracting received signaling fulfilling the quality requirement from the collected signal before changing at least one of the subset and the transform base.

11. The method according to claim 3, further comprising subtracting received signaling fulfilling the quality requirement from the collected signal before changing at least one of the subset and the transform base.

12. The method according to claim 4, further comprising subtracting received signaling fulfilling the quality requirement from the collected signal before changing at least one of the subset and the transform base.

13. The method according to claim 2, wherein evaluating comprises evaluating whether received signaling associated to one or more transmitters fulfils the quality requirement.

14. A receiver arrangement for a radio access network the receiver arrangement being configured to receive a plurality of antenna signals from a plurality of antennas, the plurality of signals being collected to form a collected signal, the receiver arrangement being further configured to:
   transform the collected signal into beam space based on a transform base, to provide a set of beams;
   select a subset of beams from the set of beams;
   evaluate the subset of beams for a quality requirement; and
   if evaluating results in the quality requirement not being fulfilled, one of:
      changing the subset of selected beams and returning to evaluating; and
      changing the transform base and return to transforming.

15. The receiver arrangement according to claim 14, wherein one of the transform base and the changed transform base is based on one of a Discrete Fourier Transform, a codebook and a Singular Value Decomposition.

16. The receiver arrangement according to claim 14, wherein the collected signal comprises received signaling from one or more transmitters.

17. The receiver arrangement according to claim 16, wherein evaluating comprises evaluating whether received signaling associated to one or more transmitters fulfils the quality requirement.

18. The receiver arrangement according to claim 14, the receiver arrangement being further configured to subtract received signaling fulfilling the quality requirement from the collected signal before changing at least one of the subset and the transform base.

19. The receiver arrangement according to claim 15, the receiver arrangement being further configured to subtract received signaling fulfilling the quality requirement from the collected signal before changing at least one of the subset and the transform base.

20. A non-transitory computer storage medium storing computer program instructions that when executed cause processing circuitry to at least one of control and perform a method of operating a receiver arrangement in a radio access network, the receiver arrangement being configured to receive a plurality of antenna signals from a plurality of antennas, the plurality of signals being collected to form a collected signal, the method comprising:

transforming the collected signal into beam space based on a transform base, to provide a set of beams;
selecting a subset of beams from the set of beams;
evaluating the subset of beams for a quality requirement; and
if evaluating results in the quality requirement not being fulfilled, one of:
  changing the subset of selected beams and returning to evaluating; and
  changing the transform base and return to transforming.

* * * * *